US006308452B1

(12) United States Patent
Fox

(10) Patent No.: US 6,308,452 B1
(45) Date of Patent: Oct. 30, 2001

(54) FISH BITE INDICATOR

(75) Inventor: Clifford Royston Fox, Essex (GB)

(73) Assignee: Fox Design International Limited, Essex (GB)

( * ) Notice: Subject to any disclaimer, the term of this patent is extended or adjusted under 35 U.S.C. 154(b) by 0 days.

(21) Appl. No.: 09/598,906

(22) Filed: Jun. 22, 2000

Related U.S. Application Data

(62) Division of application No. 09/132,310, filed on Aug. 11, 1998, now Pat. No. 6,158,163.

(51) Int. Cl.$^7$ ................................................ A01K 97/12
(52) U.S. Cl. .................................................. 43/17
(58) Field of Search ............................. 43/17, 25

(56) References Cited

U.S. PATENT DOCUMENTS

| | | | |
|---|---|---|---|
| 664,889 | 1/1901 | Ogimura | 43/25 |
| 1,709,436 | 4/1929 | Koester | 43/25 |
| 2,183,445 | 12/1939 | Conterman | 42/329 |
| 2,658,299 | 11/1953 | Maxfield | 43/15 |
| 2,713,228 | 7/1955 | Grunwald | 43/25 |
| 2,730,830 | 1/1956 | Smith | 43/25 |
| 2,791,858 | 5/1957 | Kernodle | 43/25 |
| 3,270,457 * | 9/1966 | Austin | 43/25 |
| 3,499,242 | 3/1970 | Tucker | 43/43.13 |
| 4,015,362 | 4/1977 | Johnson | 43/43.11 |
| 4,746,253 | 5/1988 | Simmons | 43/17 |
| 5,063,373 * | 11/1991 | Lindsley | 340/573 |
| 5,129,174 | 7/1992 | Wilson | 43/17 |
| 5,207,015 * | 5/1993 | Kvarnstrom | 43/25 |
| 5,430,968 * | 7/1995 | Watkins et al. | 43/25 |
| 5,450,687 | 9/1995 | Fox | 43/17 |
| 5,570,532 * | 11/1996 | Shaffer et al. | 43/17 |
| 6,101,757 * | 8/2000 | Draghici | 43/17 |

FOREIGN PATENT DOCUMENTS

| | | |
|---|---|---|
| 524922 | 7/1950 | (CA) . |
| 540116 | 2/1952 | (CA) . |
| 964491 | 8/1950 | (FR) . |
| 1176849 | 4/1959 | (FR) . |
| 1195493 | 11/1959 | (FR) . |
| 1418726 | 10/1965 | (FR) . |
| 575057 | 3/1958 | (IT) . |

* cited by examiner

Primary Examiner—Kurt Rowan
(74) Attorney, Agent, or Firm—Clark & Brody

(57) ABSTRACT

A fish-bite indicator (100) comprises an arm (102) pivotally mounted on a pivotal mount (104) at one of its ends and which has a fishing line engagement element (18 and 24) at the other. A helical spring (144) is provided at the pivotal mount (104) to vary the force with which the engagement element (18 and 24) acts on the line (82), the spring (144) acting on one of two parts (120 and 134), which can be selectively rotated relative to one another to vary the torsional force exerted by the helical spring (144). The two parts (120 and 134) are held at a selected one of a plurality of available relative angular positions by mutually engaging castellations (154 and 156).

5 Claims, 7 Drawing Sheets

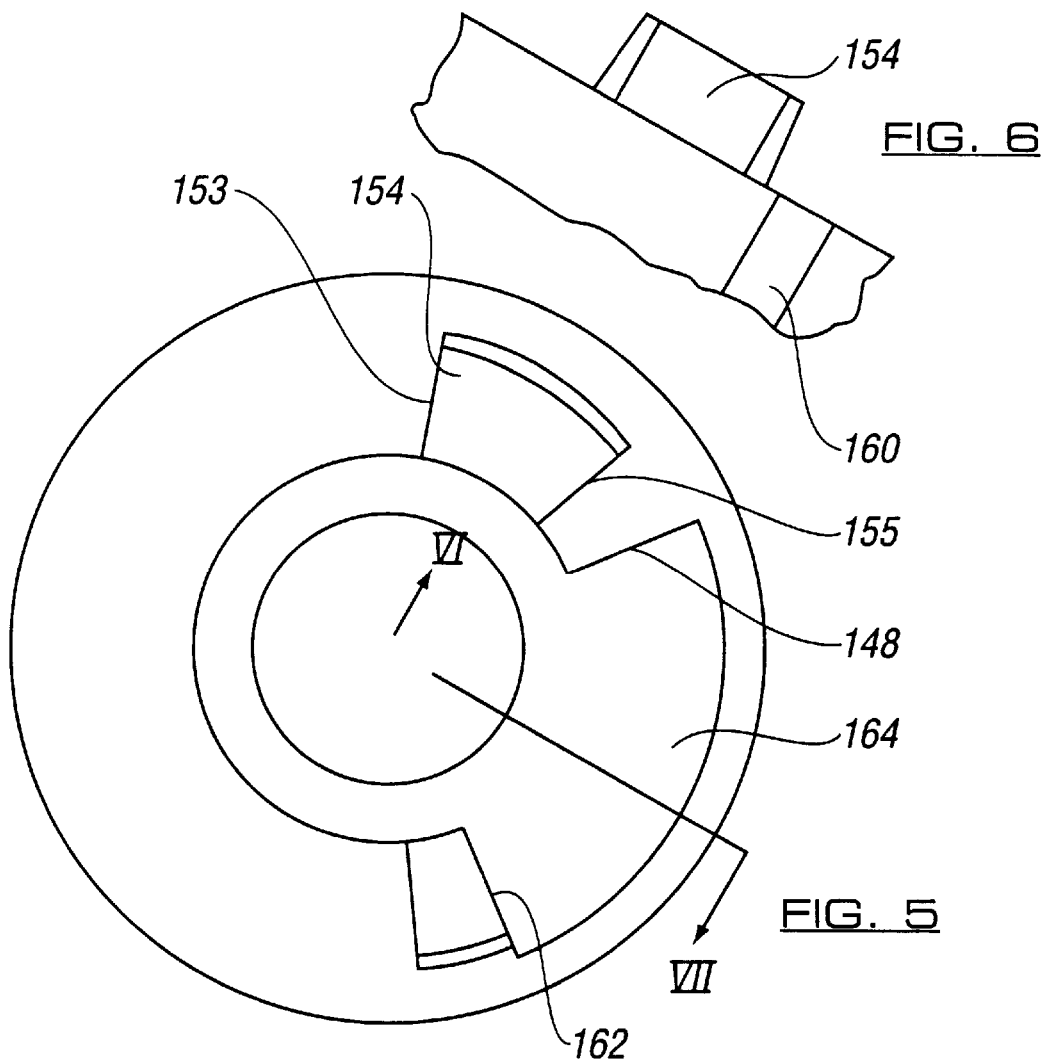
FIG. 6
FIG. 5
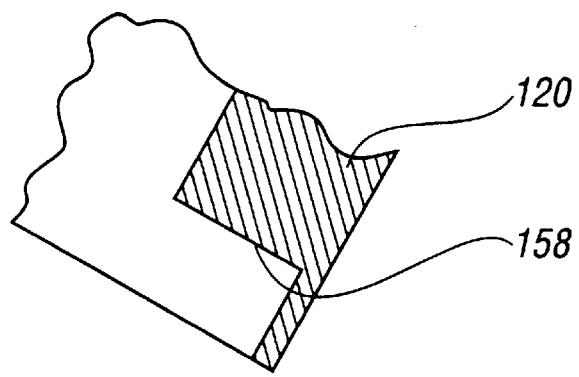
FIG. 7

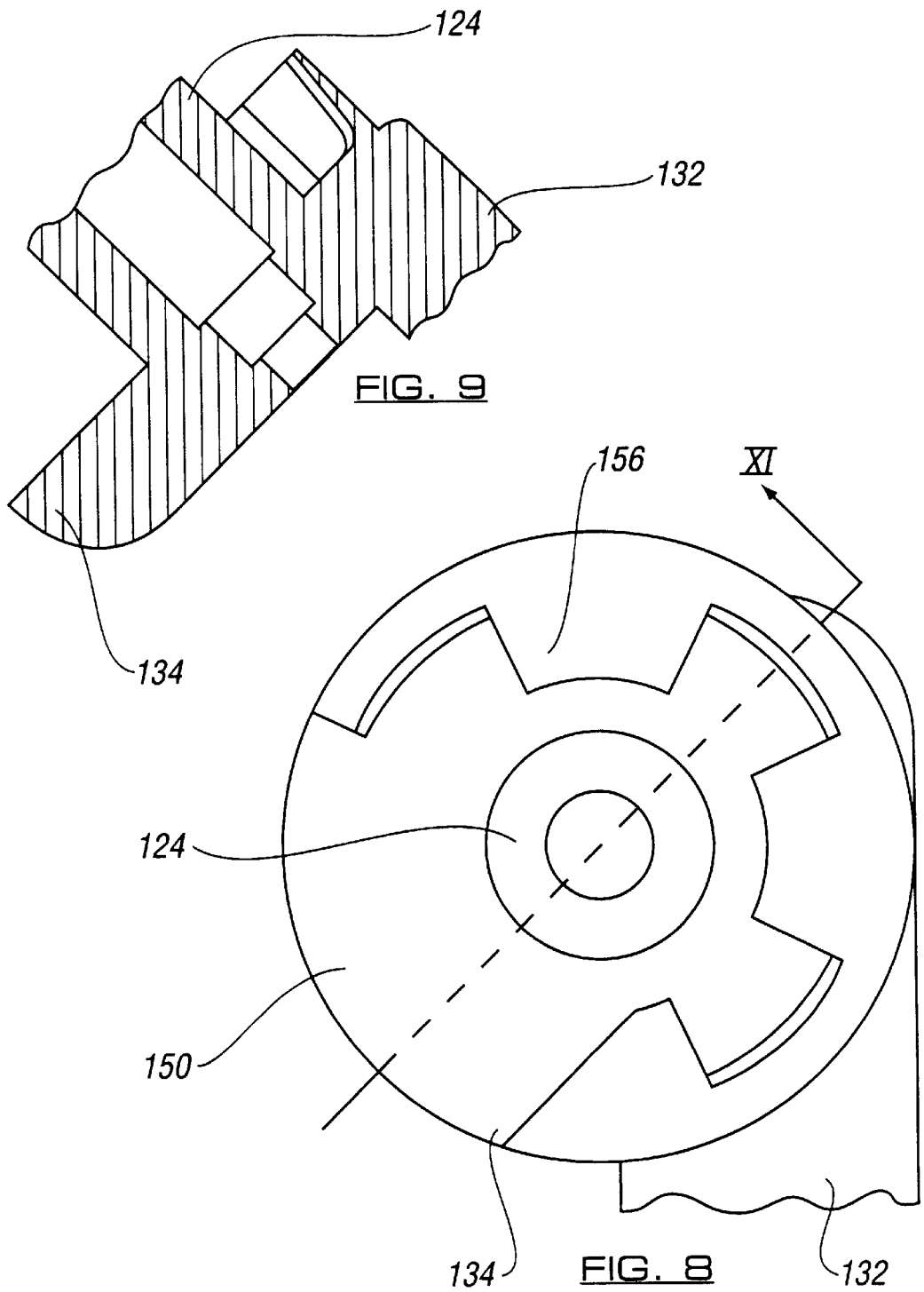

FISH BITE INDICATOR

CROSS REFERENCE TO RELATED APPLICATION

This application is a division of U.S. patent application Ser. No. 09/132,310, which was filed on Aug. 11, 1998 now U.S. Pat. No. 6,158,163.

TECHNICAL FIELD

This invention relates to the art of fish-bite indicators.

BACKGROUND ART

The present invention is relates to a fish-bite indicator comprising an arm that is pivotally mounted on a pivotal mount at one of its ends and has a fishing line engagement element at the other. A resilient clement is provided at the pivotal mount to vary the force with which the engagement element acts on the line, and the resilient element acts on one of two parts that can be selectively rotated relative to one another to vary the torsion force exerted by the resilient element.

One such construction that has been proposed has ratchet element between the two parts, making it a relatively complex and expensive construction.

It is the aim of the present invention to obviate one or more of these disadvantages.

SUMMARY OF THE INVENTION

Accordingly, the present invention is directed to a fish-bite indicator having two parts that are relatively movable about an axis of rotation and are held at a selected one of a plurality of available relative angular positions by mutually engaging portions, at least one of which has a leading face and a trailing face that extend generally parallel to the axis of relative rotation.

BRIEF DESCRIPTION OF THE DRAWINGS

An example of a fish-bite indicator, in accordance with the present invention, will now be described with reference to the accompanying drawings in which:

FIG. 5 shows an end view of a component viewed in the direction V indicated in FIG. 3;

FIG. 6 shows a portion of the component shown in FIG. 5 viewed in the direction VI indicated in FIG. 5;

FIG. 7 shows a portion of the component shown in FIG. 5 viewed in the direction VII indicated in FIG. 5;

FIG. 8 shows an end view of a further component viewed in the direction VIII indicated in FIG. 3;

FIG. 9 shows a sectional view of the component shown in FIG. 8 taken along the line IX indicated therein.

DETAILED DESCRIPTION OF THE PREFERRED EMBODIMENT

Figure 1:
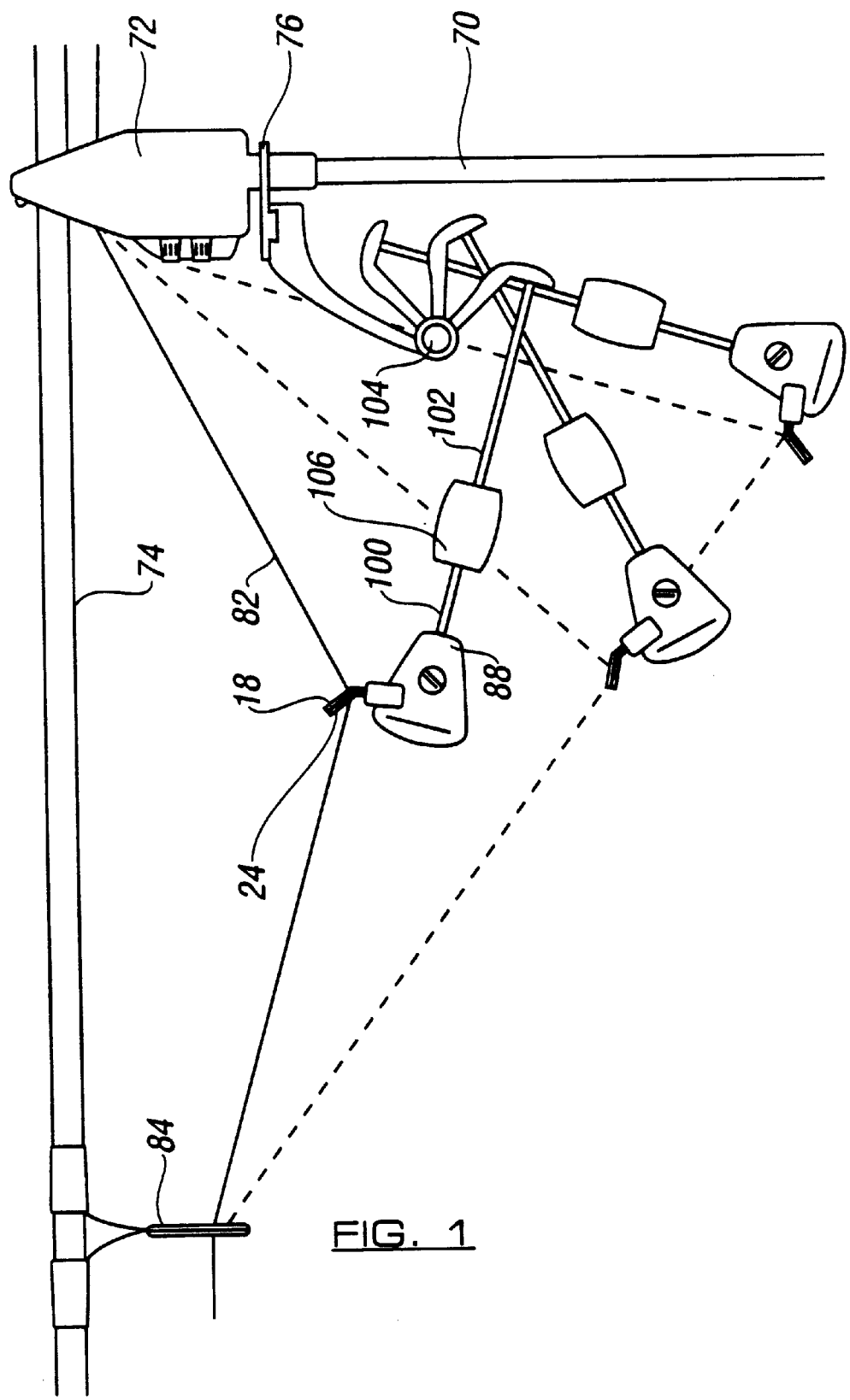
FIG. 1 is a view from one side of angling apparatus including a fish-bite indicator made in accordance with the present invention.

In the angling apparatus shown in FIG. 1, there is shown a bank stick 70 on the upper end of which is mounted a bifurcated electronic bite indicator 72. A fishing rod 74 is seated within the bifurcations of the electronic bite indicator 72.

A mounting plate 76 is secured between the bite indicator 72 and the top of the ban stick 70, and to that mounting plate 76 is secured a fish-bite indicator 100 in the form of a generally rigid arm 102, which is connected at one end to a pivot 104, the other end of the arm 102 being provided with a head 88. A fishing line 82 is held between a pair of leg portions 18 and 24 of the head 88 so that the fishing line 82 traces out a V shape between the bite indicator 72 and one of the rings 84 (the others not being shown) of the fishing rod 74.

A slideable weight 106 is attached to the arm 102 and can be slid backwardly or forwardly along the arm to adjust the tension of the line 82. FIG. 1 provides a diagrammatic representation of three different, possible positions of the bite indicator 100. For two of these positions, the fishing line 82 is shown as a broken line.

If the angler reacts to a bite indicated by one or both of the bite indicators 72 and 100 and makes a strike, the line 82 is readily released from between the legs 18 and 24.

Figure 2:
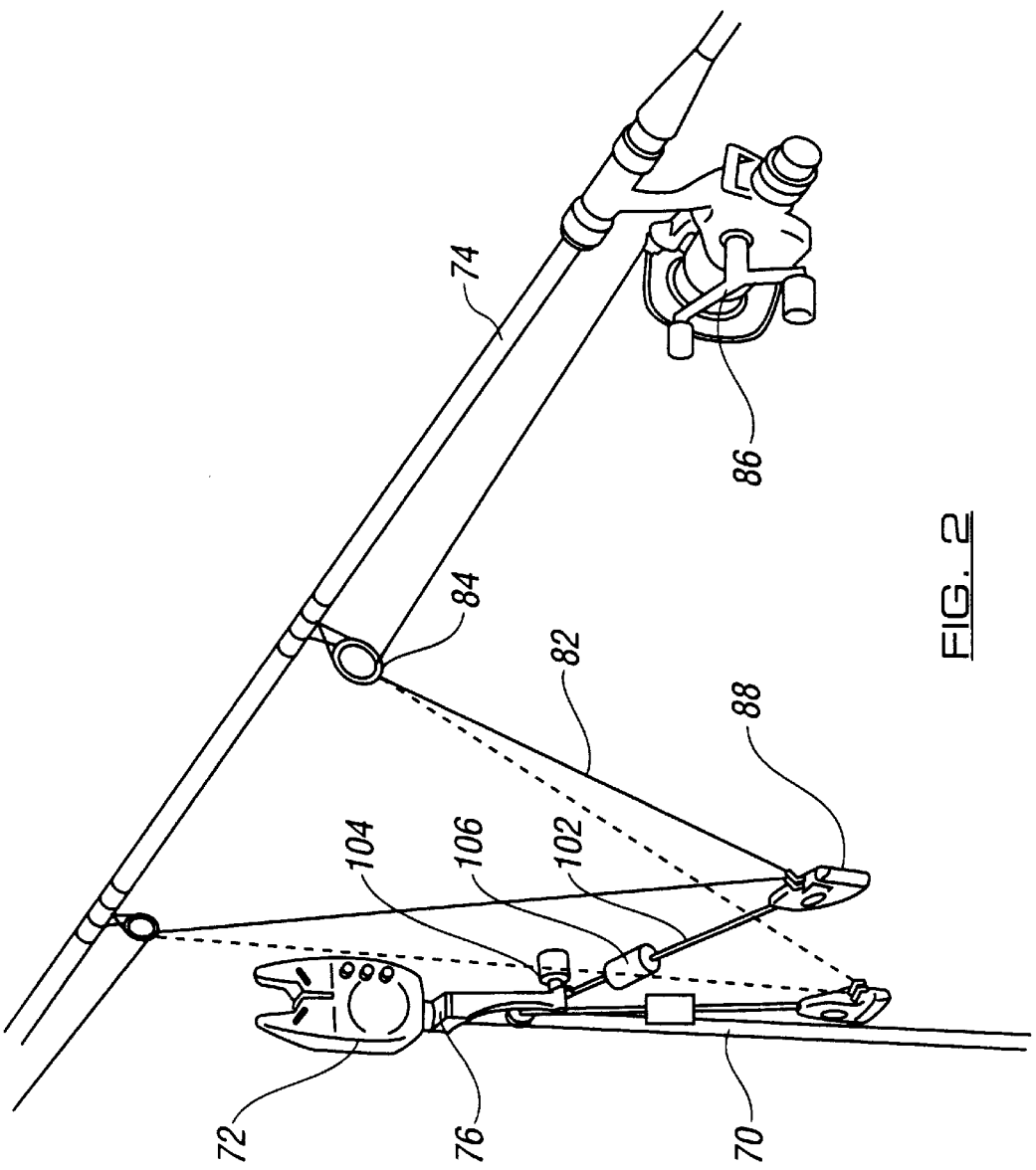
FIG. 2 shows a perspective view from the other side and above the apparatus shown in FIG. 1, with further parts of the apparatus in view.

FIG. 2 shows the apparatus from the other side and also shows a reel 86 of the rod 74. It also shows the commencement of a strike insofar as the rod 74 has been lifted clear of the bite indicator 72, and the line 82 is about to be released from the head 88 at the end of the fish-bite indicator 100.

FIGS. 3 to 10 show the details of the pivot 104 illustrated in FIGS. 1 and 2. The pivot comprises a generally cylindrical housing 120, which is provided with a knurled portion 122 at an outer end thereof to assist the user in grasping and rotating the latter. The housing 120 surrounds an axially-extending, hollow shaft 124, an outer end of which is closed by means of a flanged plug 126 having an annular a groove 128 extending around the outside of this flange. An open frictional ring 130 is seated within this groove 128 so that a portion of the ring 130 protrudes outwardly therefrom and contacts an inner face of the cylindrical housing 120.

Figures 3, 3A:
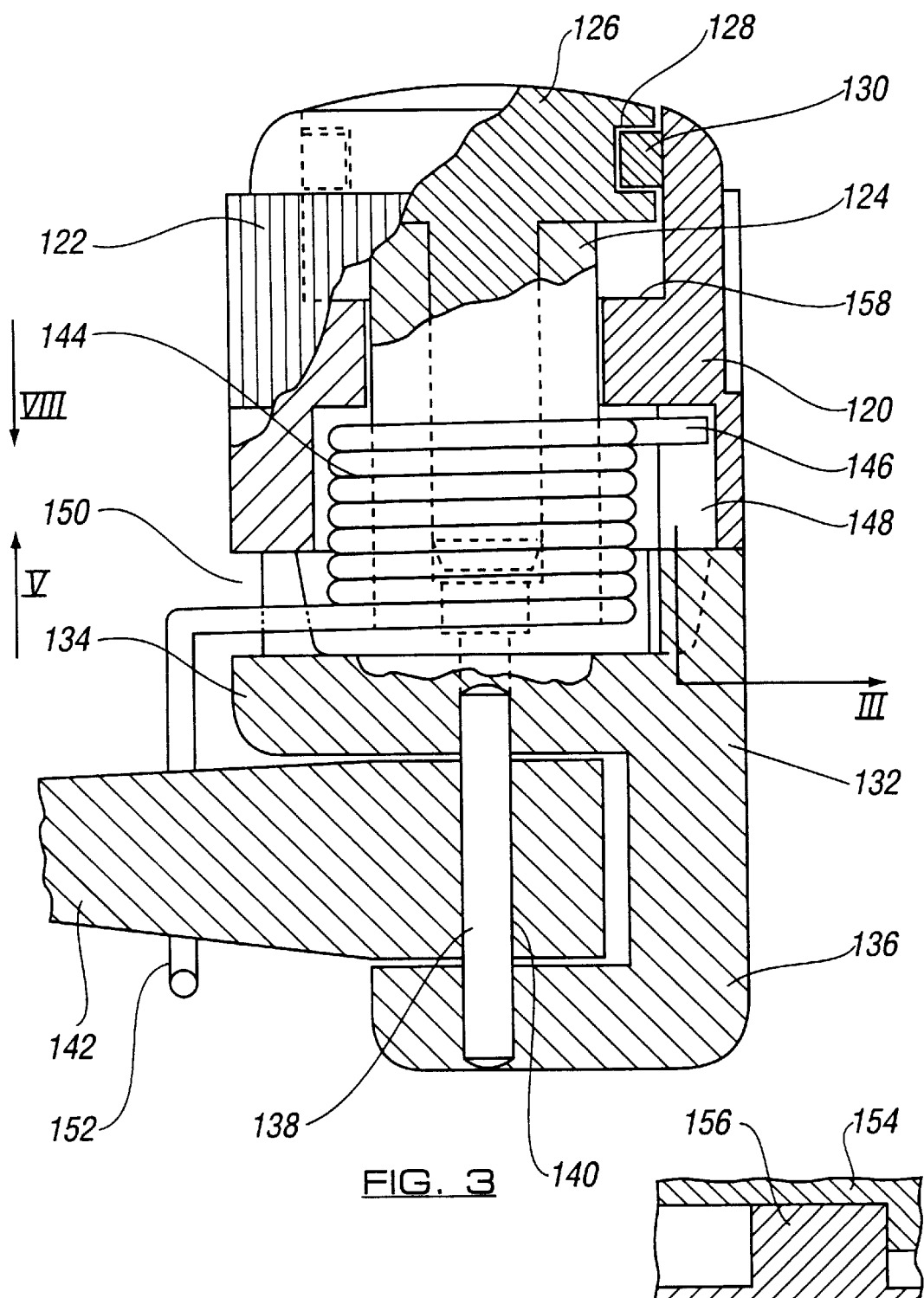
FIG. 3 shows an axial sectional view through a part of the apparatus shown in FIG. 2.
FIG. 3a shows a sectional view taken along line III in FIG. 3.

The shaft 124 is integral with a mount 132, which has a generally circular base portion 134 and a further portion 136, which is generally L-shaped in the axial section shown in FIG. 3. A pivot pin 138 has respective ends received in respective holes of the two portions 134 and 136. The pin 138 extends through a through hole 140 provided in the end of a pivoted connector member 142 to which is secured the pivot arm 102 shown in FIGS. 1 and 2.

An axially-extending helical spring 144 is enclosed within the housing 120, and has one end 146 abutting against an abutment 148 provided on the interior of the housing 120, and another end which extends outwardly from the housing 120 through a slot 150 provided therein and thence in an axial direction to a portion 152 of that end of the spring 144 which engages the connecting portion 142 at a position thereof which is spaced from the pivot pin 138.

The housing 120 and the base 134 inter-engage with one another by respective castellations 154 and 156, as shown more clearly in FIG. 3a.

Figure 4:
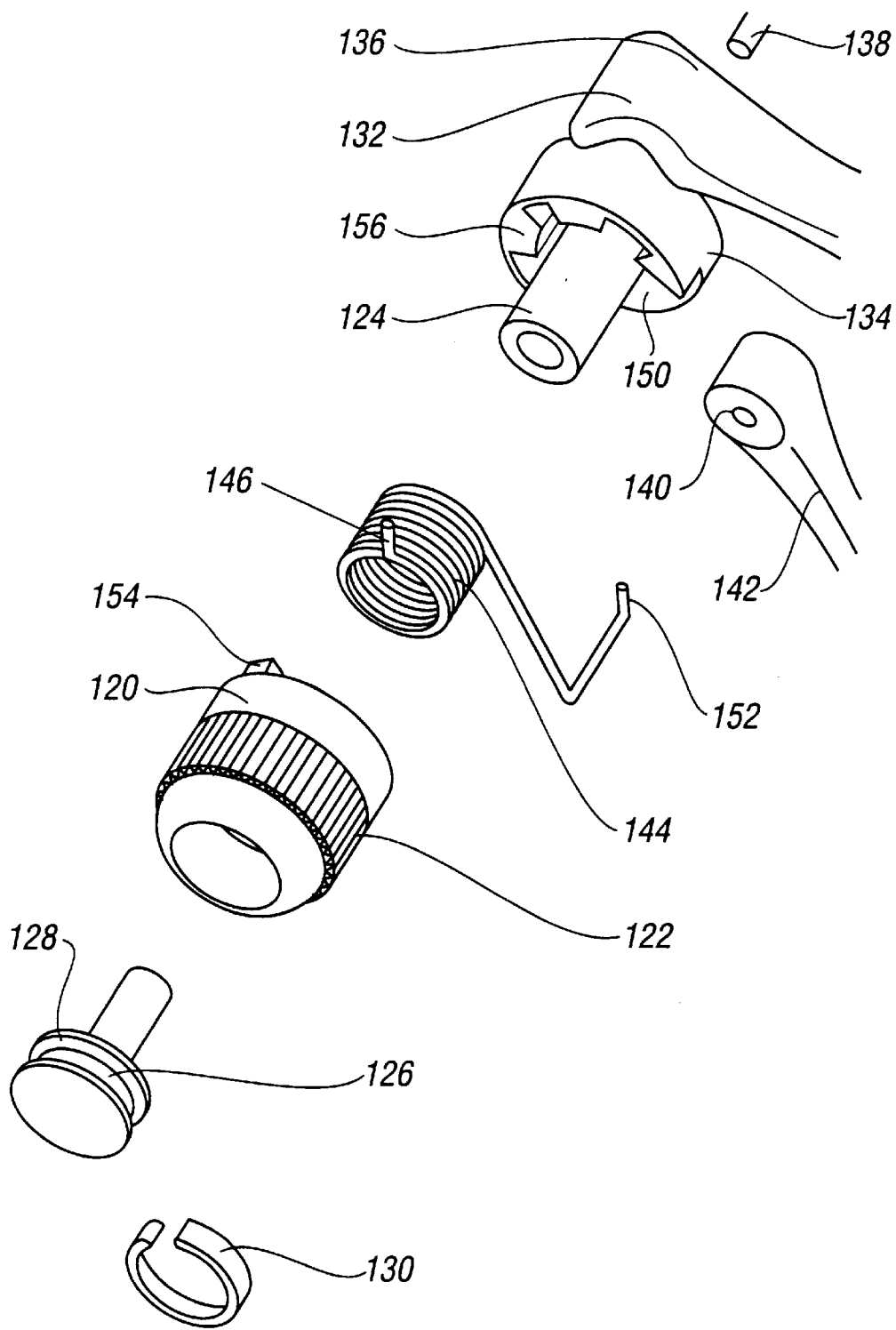
FIG. 4 shows an exploded view of the part of the apparatus shown in FIG. 3.
Figure 10:
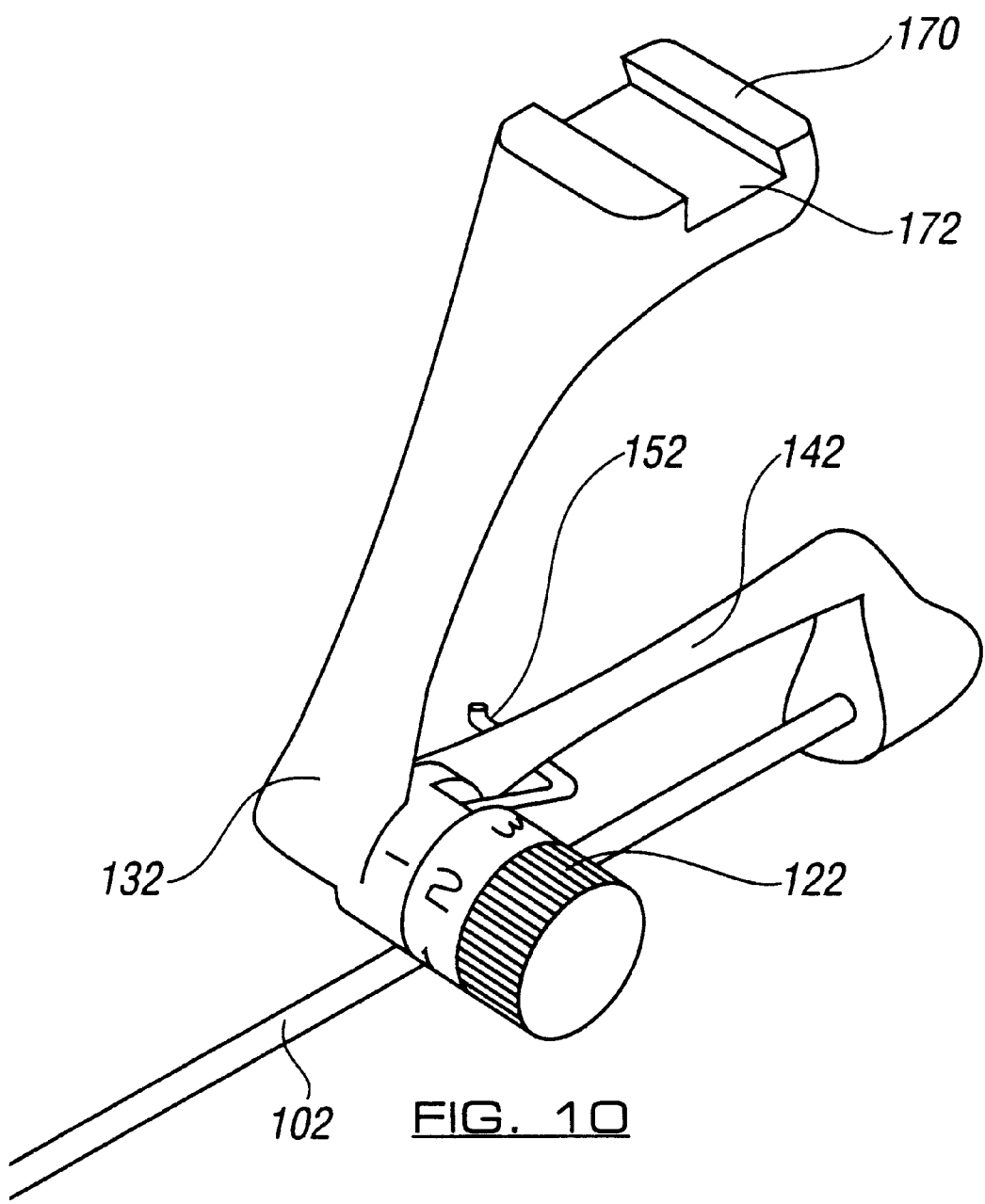
FIG. 10 shows a perspective view of the part shown in FIG. 3 with further portions thereof shown more fully.

FIGS. 4 and 10 show more clearly how the mount 132 is made integral with an attachment portion 170, which has a female part of a dovetail joint 172 to enable the pivot 104 to be connected to the plate 76 shown in FIGS. 1 and 2. FIG. 10 also shows how the spring assembly acts on the arm 102 also shown in FIGS. 1 and 2.

It will be appreciated from FIG. 3 that the spring 144 acts on the connector member 142 to urge the latter to rotate about the pin 138. This may be used to increase the downward pull of the head 88 on the line 82 or to counter the torque already applied by the weight 106. It, therefore, can be used to provide a fine adjustment to this torque. Alternatively, the weight 106 may provide the fine adjustment relative to the spring assembly. This adjustment itself may be varied by rotation of the housing 120 relative to the base 134. To effect such rotation, the housing 120 is first moved axially and outwardly away from the base 132 to disengage the respective castellations 154 and 156. A shoulder 158 provided on the inside of the housing 120 will abut the flange of the plug 126 if the housing 120 is pulled out too far. In this way, the plug 126 acts as a stop against accidental removal of the housing 190.

At least one of the castellations 154 or 156 has leading and trailing faces, such as the leading and trailing faces shown at 153 and 155 on castellation 154 in FIG. 5. It will be appreciated that these faces extend in the direction of the axis about which the base and housing parts rotate with respect to each other.

The housing 120 may now be rotated about the axis of the pivot to increase or decrease the force applied by the spring 144 to the connector member 142. The selected axial rotation can be maintained by re-engaging the castellations 154 and 156 of the housing 120 and the base 134 (although the ones actually labeled 154 and 156 will not now be engaging one another).

In a zero setting of the housing 120, the relative positions of the housing and base are such that the end 146 of the spring 144 is free to move between the abutments 148 and 162 without any force being applied by the spring to the connecting member 142. In this way a zero or a generally optimum setting can be made by means of the weight 106 without interference from the spring, and then a finer adjustment can be made by means of the spring assembly by subsequent rotation of the housing 120.

Many variations and modifications to the illustrated indicator will readily occur to the reader of ordinary skill in the art without taking it outside the scope of the present invention. For example, foam or rubber could perform the function of the spring 144.

I claim:

1. A fish-bite indicator comprising a pivotal mount having first and second parts capable of selective rotation with respect to each other about an axis and an arm having a first end and a second end, said arm being pivotally mounted at said first end to said pivotal mount and mounted to a fishing-line engagement element at said second end, whereby a fish-bite is indicated by a pivotal movement of the arm about said pivotal mount, the fish-bite indicator further comprising a resilient element at said pivotal mount arranged to vary a force applied by said fishing-line engagement element to a fishing line, said resilient element acting on at least one of said first and second parts, wherein said first and second parts are held at a selected one of a plurality of available relative angular positions by mutually engaging portions, at least one of which has a leading face and a trailing face that extend generally parallel to said axis.

2. A fish-bite indicator according to claim 1, wherein said mutually engaging portions comprise castellations.

3. A fish-bite indicator according to claim 1, wherein said resilient element (144) comprises a spring (144).

4. A fish-bite indicator according to claim 3, wherein said spring is a helical spring.

5. A fish-bite indicator according to claim 1 wherein the pivotal mount is constructed such that, in one of the said plurality of available positions, the said two parts can rotate relative to one another without interference from the resilient means.

* * * * *